United States Patent
Kim et al.

(10) Patent No.: US 9,178,205 B2
(45) Date of Patent: Nov. 3, 2015

(54) RECHARGEABLE BATTERY

(75) Inventors: Duk-Jung Kim, Yongin-si (KR);
Min-Hyung Guen, Yongin-si (KR);
Joong-Heon Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 20 days.

(21) Appl. No.: 13/480,244

(22) Filed: May 24, 2012

(65) Prior Publication Data

US 2013/0052520 A1   Feb. 28, 2013

(30) Foreign Application Priority Data

Aug. 23, 2011   (KR) .................. 10-2011-0084054

(51) Int. Cl.
*H01M 2/30* (2006.01)
*H01M 2/26* (2006.01)
*H01M 2/12* (2006.01)

(52) U.S. Cl.
CPC .............. *H01M 2/263* (2013.01); *H01M 2/12* (2013.01)

(58) Field of Classification Search
CPC ......... H01M 2/30; H01M 2/12; Y02E 60/122
See application file for complete search history.

(56) References Cited

U.S. PATENT DOCUMENTS

| | | | |
|---|---|---|---|
| 7,273,679 B2 | 9/2007 | Yoon et al. | |
| 2008/0118824 A1 | 5/2008 | Oguma et al. | |
| 2010/0323239 A1 | 12/2010 | Kim | |
| 2011/0151295 A1 | 6/2011 | Kim | |
| 2011/0151318 A1 | 6/2011 | Lee et al. | |

FOREIGN PATENT DOCUMENTS

| | | |
|---|---|---|
| EP | 2 228 852 A1 | 9/2010 |
| JP | 2001-273931 | 10/2001 |
| JP | 2008-153203 | 7/2008 |
| KR | 10-2006-0037594 A | 5/2006 |
| KR | 10-0599754 B1 | 7/2006 |
| KR | 10-2010-0137903 A | 12/2010 |
| WO | WO 2005/117196 A1 | 12/2005 |
| WO | WO2005117196 A1 * | 12/2005 |

OTHER PUBLICATIONS

European Patent Office Extended European Search Report for EP 12179507.4, dated Nov. 14, 2012, 6 pgs.
Patent Abstracts of Japan and English Machine Translation of JP 2001-273931, 6 pgs.
EPO Office action dated Aug. 14, 2015, for corresponding European Patent application 12179507.4, (6 pages).

* cited by examiner

*Primary Examiner* — Ula C Ruddock
*Assistant Examiner* — Lisa S Park
(74) *Attorney, Agent, or Firm* — Christie, Parker & Hale, LLP (57) ABSTRACT

A rechargeable battery including: an electrode assembly including a first electrode, a second electrode, and a separator between the first and second electrodes; a case receiving the electrode assembly; a cap plate coupled to the case; an electrode terminal connecting the electrode assembly to an outside of the cap plate; and a lead tab electrically connecting the electrode assembly and the electrode terminal, and the electrode assembly includes a coated region of the first electrode, and an uncoated region of the first electrode adjacent an end portion of the coated region, the uncoated region having a through hole formed therein and connecting an inner portion of the electrode assembly to an outside of the electrode assembly.

9 Claims, 8 Drawing Sheets

RECHARGEABLE BATTERY

CROSS-REFERENCE TO RELATED APPLICATION

This application claims priority to and the benefit of Korean Patent Application No. 10-2011-0084054, filed on Aug. 23, 2011 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery is a battery that is repeatedly charged and discharged, unlike a primary battery. Low-capacity rechargeable batteries may be used for portable compact electronic apparatuses such as mobile phones, notebook computers, and camcorders, and high-capacity rechargeable batteries may be used as a power supply for driving a motor of a hybrid vehicle, an electric vehicle, etc.

For example, the rechargeable battery generally includes an electrode assembly, a case for receiving the electrode assembly, a cap plate combined to an opening of the case, and an electrode terminal installed in the cap plate and connected to the electrode assembly. The cap plate includes a terminal hole for installing the electrode terminal and a vent hole. The vent hole has a vent plate made of a thin plate with a thinner thickness than the cap plate and is welded to the cap plate to close and seal it.

The rechargeable battery generates internal gas during charge and discharge of the electrode assembly. Also, under an internal short circuit generation of the rechargeable battery, that is, under a short circuit of a positive electrode and a negative electrode of the electrode assembly, heat is generated and an electrolyte solution is decomposed while a potential difference of the charged positive electrode and negative electrode is quickly reduced. When the electrolyte solution is decomposed, a large amount of gas such as methane, hydrogen, or carbon dioxide is generated such that the internal pressure of the rechargeable battery is quickly increased.

Generally, the electrode assembly includes a negative electrode and a positive electrode at respective surfaces of a separator and is formed by winding the negative electrode, the separator, and the positive electrode in a jelly roll state, and has an uncoated region of the negative electrode and the positive electrode where the separator is not interposed. The uncoated region is welded to a lead tab that is compressed and deformed, thereby being electrically connected to the electrode terminal.

The uncoated region blocks the negative electrode, the separator, and the positive electrode from the outside of the electrode assembly, while forming a slant region at the end of the coated region under the compression and deformation. Accordingly, under the internal short circuit generation of the electrode assembly or when leaving the rechargeable battery, the internal gas generated inside the electrode assembly is blocked in the slant region. The dispersion and emission of the internal gas is thereby deteriorated.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery has improved dispersion and emission of an internal gas by providing an exhaust path in communication between the inside and outside of an electrode assembly at an uncoated region of the electrode assembly.

According to an exemplary embodiment of the present invention, a rechargeable battery includes: an electrode assembly including a first electrode, a second electrode, and a separator between the first and second electrodes; a case receiving the electrode assembly; a cap plate coupled to the case; an electrode terminal connecting the electrode assembly to an outside of the cap plate; and a lead tab electrically connecting the electrode assembly and the electrode terminal, and the electrode assembly includes a coated region of the first electrode, and an uncoated region of the first electrode adjacent an end portion of the coated region, the uncoated region having a through hole formed therein and connecting an inner portion of the electrode assembly to an outside of the electrode assembly.

The uncoated region may include a slant region extending toward the end portion of the coated region, and a junction region connected to the slant region and coupled to the lead tab, and the through hole may be at least formed at the slant region.

The through hole may be formed as a slot extending from the slant region to the junction region.

The through hole may be penetrated and formed in a direction intersecting the slant region in the slant region.

The electrode assembly may further include a first outer surface and a second outer surface opposite the first outer surface, and, in the uncoated region, the first outer surface may be a planar surface extending between the junction region and the slant region, and the second outer surface may include a curved surface between the junction region and the slant region.

The uncoated region may include a plurality of uncoated regions, and the through hole may be formed through the uncoated regions in the slant region, and the through hole may have a largest area at the second outer surface and a smallest area in the first outer surface.

The electrode assembly may further include a first outer surface and a second outer surface opposite the first outer surface, the uncoated region may include a plurality of uncoated regions, and the through hole may be formed through the uncoated regions in the slant region, the slant region may include passages between the uncoated regions, and the passages may form a largest opening area at a side proximate the second outer surface and a smallest opening area at a side proximate the first outer surface, and may be connected to the through hole.

The electrode assembly may further include a first outer surface and a second outer surface opposite the first outer surface, and, in the uncoated region, the first outer surface may include a first curved surface between the junction region and the slant region, and the second outer surface may include a second curved surface between the junction region and the slant region that is symmetrical to the first curved surface.

The uncoated region may include a plurality of uncoated regions, and the through hole may be formed through the uncoated regions in the slant region, and the through hole may have a largest area at the first and second outer surfaces and a smallest area at a location that is central between the first and second outer surfaces.

The electrode assembly may further include a first outer surface and a second outer surface opposite the first outer surface, the uncoated region may include a plurality of uncoated regions, and the through hole may be formed through the uncoated regions in the slant region, the slant region may include passages between the uncoated regions, and the passages form a same largest opening area at sides proximate the first and second outer surfaces and a smallest opening area at a location that is central between the first and second outer surfaces, and may be connected to the through hole.

According to an aspect of embodiments of the present invention, the through holes are formed in the uncoated region of the electrode assembly, thereby providing the exhaust path communicating between the inside and the outside of the electrode assembly, and as a result, gas generated inside the electrode assembly may be effectively dispersed and emitted outside the electrode assembly. That is, the dispersion and the emission performance of an expanding gas inside the electrode assembly is improved. According to another aspect of embodiments of the present invention, the through holes are formed in the uncoated region to remove a portion of the uncoated region such that the weight of the electrode assembly and the rechargeable battery is reduced. In the rechargeable battery according to embodiments of the present invention, the gas generated inside the electrode assembly is quickly emitted outside the electrode assembly through the through holes, ruptures the vent plate, and is emitted through the vent hole. As such, a rechargeable battery according to embodiments of the present invention is particularly suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

Description of Reference Numerals Indicating Some Elements in the Drawings

| | |
|---|---|
| 10, 210: electrode assembly | 11: negative electrode |
| 11a, 12a, 14a: coated region | 11b, 12b, 14b: uncoated region |
| 12: positive electrode | 13: separator |
| 20: case | 21: opening |
| 30: cap plate | 31: electrolyte injection opening |
| 32: vent hole | 33: seal stopper |
| 34: vent plate | 41, 42: negative and positive terminals |
| 41a, 42a: flange | 41b, 42b: terminal plate |
| 45, 46: gasket | 47, 48: insulator |
| 51: negative electrode lead tab | 52, 252: positive lead tab |
| 61, 62, 262: through hole | 71, 72, 272: insulating member |
| 100, 200: rechargeable battery | 311, 312: terminal holes |
| A1, A21: slant region | A2, A22: junction region |
| P, P2: passage | S1, S21: first outer surface |
| S2, S22: second outer surface | |

DETAILED DESCRIPTION

In the following detailed description, some exemplary embodiments of the present invention are shown and described, by way of illustration. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
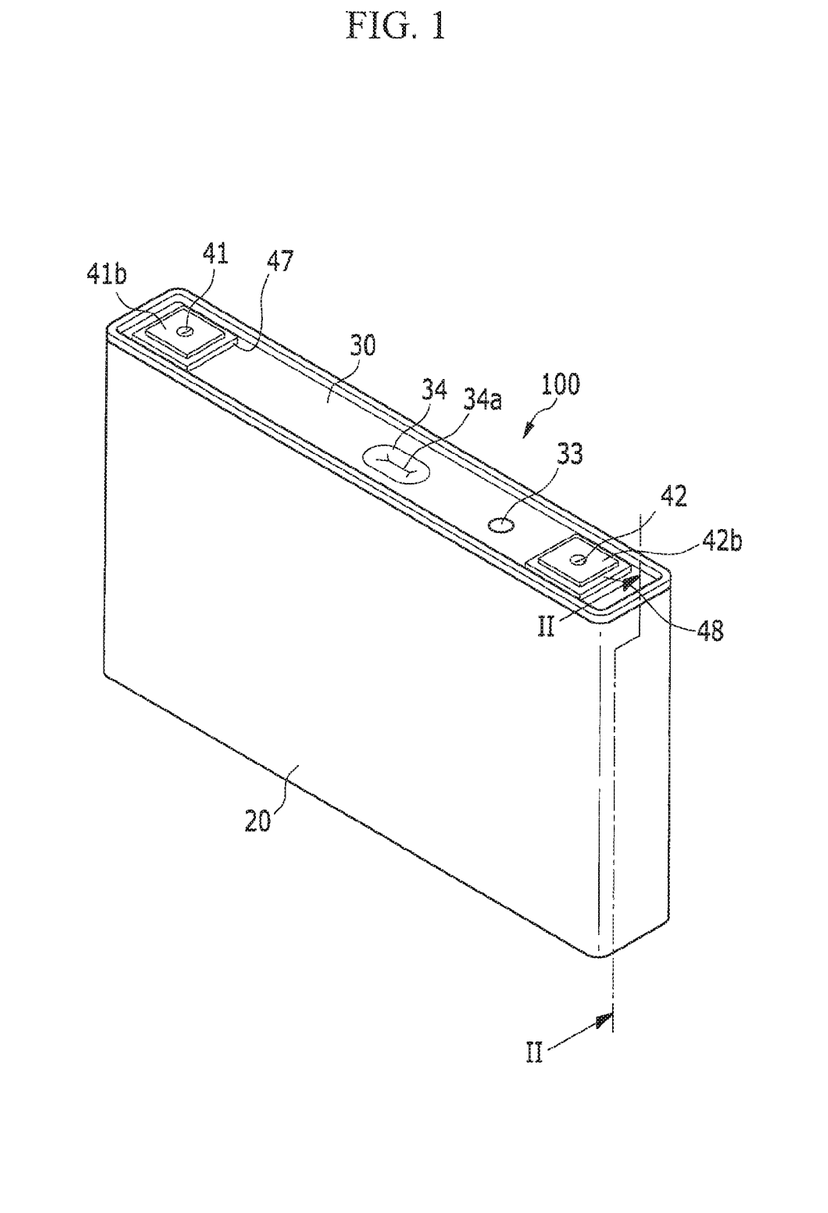
FIG. 1 is a perspective view of a rechargeable battery according to an exemplary embodiment of the present invention.
Figure 2:
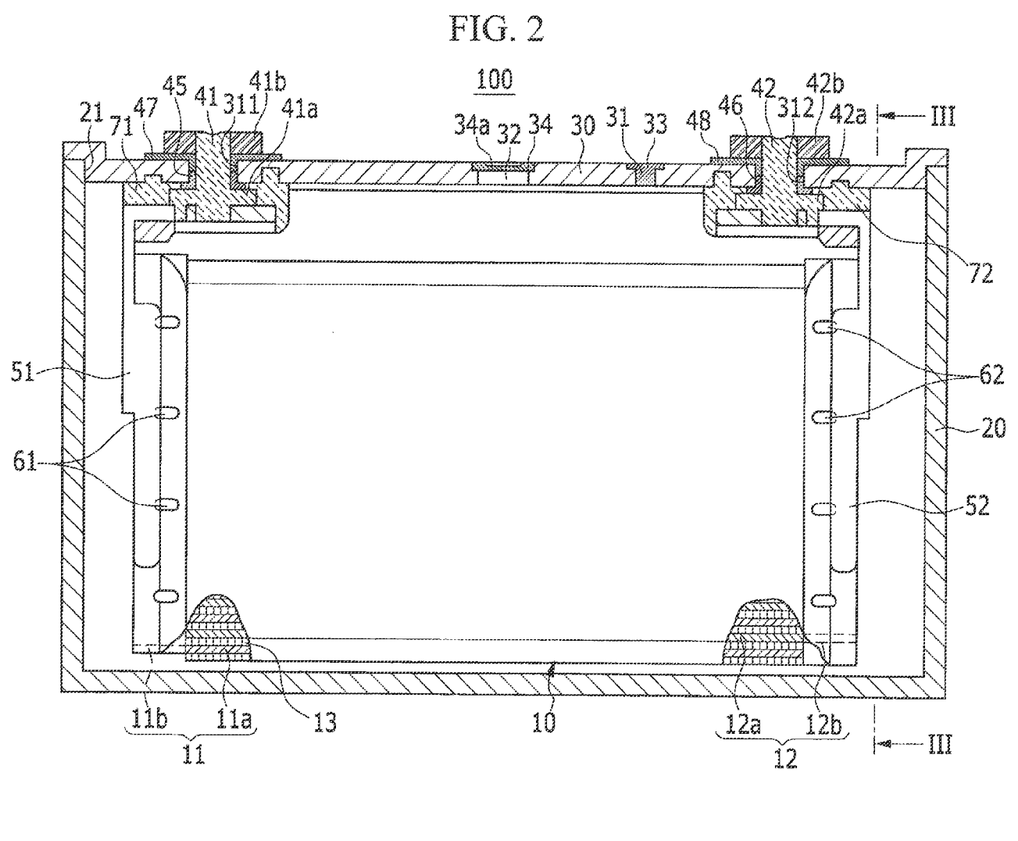
FIG. 2 is a cross-sectional view of the rechargeable battery of FIG. 1, taken along the line II-II.

FIG. 1 is a perspective view of a rechargeable battery according to an exemplary embodiment of the present invention, and FIG. 2 is a cross-sectional view of the rechargeable battery of FIG. 1, taken along the line II-II. Referring to FIG. 1 and FIG. 2, a rechargeable battery 100 according to an exemplary embodiment of the present invention includes an electrode assembly 10 that performs charging and discharging, a case 20 housing an electrolyte solution with the electrode assembly 10, a cap plate 30 coupled to an opening of the case 20, negative and positive electrode terminals 41 and 42 installed to and penetrating through the cap plate 30, and negative and positive lead tabs 51 and 52 electrically connecting the electrode assembly 10 and the respective negative and positive electrode terminals 41 and 42.

The electrode assembly 10 includes electrodes, that is, a negative electrode 11 and a positive electrode 12, disposed at respective sides of a separator 13, which is an electrical insulator, and, in one embodiment, is formed by winding the negative electrode 11, the separator 13, and the positive electrode 12 in a jelly roll state. Alternatively, the electrode assembly may be assembled by laminating a negative electrode and a positive electrode each formed of a single plate with the separator interposed therebetween or assembled by bending and laminating the negative electrode, the separator, and the positive electrode in a zigzag fashion (not shown).

The negative and positive electrodes 11 and 12 include coated regions 11a and 12a formed by coating an active material on each current collector, and uncoated regions 11b and 12b formed of an exposed portion of the current collector that is not coated with the active material at one side of each of the coated regions 11a and 12a, respectively. For example, the current collector of the negative electrode 11 may be formed of copper, and the current collector of the positive electrode 12 may be formed of aluminum.

The uncoated region 11b of the negative electrode 11 is formed at the end portion of the wound (e.g., spiral-wound) negative electrode 11. The uncoated region 12b of the positive electrode 12 is formed at the end portion of the wound (e.g., spiral-wound) positive electrode 12. The uncoated regions 11b and 12b are formed at both ends of the electrode assembly 10, that is, at ends of the coated regions 11a and 12a, such that an electrical connection may be provided between the electrode assembly 10 and the negative and positive lead tabs 51 and 52.

The uncoated regions 11b and 12b have through holes 61 and 62 connecting the inside and outside of the electrode assembly 10. The through holes 61 and 62 function as exhaust paths by connecting the inside of the electrode assembly 10 to the outside thereof, and during charge and discharge, and in the event of an internal short circuit, the gas generated inside the electrode assembly 10 is dispersed and emitted to the outside of the electrode assembly 10.

In one embodiment, an opening 21 is formed at one side of the case 20 such that the electrode assembly 10 may be inserted through the opening 21 and a space for receiving the electrode assembly 10 and the electrolyte solution is formed, and, as one example, may have a generally rectangular parallelepiped shape. The cap plate 30 is coupled with the opening 21 of the case 20 and thus defines a closed receiving space together with the case 20. For example, in one embodiment, the case 20 and the cap plate 30 are made of aluminum and coupled with each other by welding, and the welding property is improved because the case 20 and the cap plate 30 are made of the same material.

The cap plate 30, in one embodiment, has an electrolyte injection opening 31 and a vent hole 32. The electrolyte injection opening 31 allows the electrolyte solution to be injected into the case 20 after the cap plate 30 and the case 20 are coupled to each other. After injection of the electrolyte solution, the electrolyte injection opening 31 is sealed by a sealing cap 33.

In one embodiment, the vent hole 32 is closed and sealed by a vent plate 34 that is welded to the cap plate 30 to prevent or substantially prevent explosion of the rechargeable battery by emitting internal gas that is generated by charging and discharging the rechargeable battery to the outside. The gas generated inside the electrode assembly 10 is quickly dispersed and emitted to the outside of the electrode assembly 10 through the through holes 61 and 62 formed at the uncoated regions 11b and 12b inside the case 20. Accordingly, the internal pressure of the rechargeable battery 100 reaches a certain pressure (e.g., a predetermined pressure) such that the vent plate 34 that is welded to the cap plate 30 at the vent hole 32 is ruptured. In one embodiment, a notch 34a is formed in the vent plate 34 to facilitate rupturing of the vent plate 34. When the vent hole 32 is opened due to the rupture of the vent plate 34, the internal gas of the rechargeable battery 100 is emitted.

The cap plate 30, in one embodiment, has terminal holes 311 and 312 for electrical connection between the inside and the outside of the case 20. The negative and positive terminals 41 and 42 are respectively provided in the terminal holes 311 and 312 and are electrically connected respectively to the negative and positive lead tabs 51 and 52 and to the electrode assembly 10. In one embodiment, the negative terminal 41 is electrically connected to the negative electrode 11 of the electrode assembly 10 through the negative lead tab 51, and the positive terminal 42 is electrically connected to the positive electrode 12 of the electrode assembly 10 through the positive lead tab 52.

In a state in which the negative and positive terminals 41 and 42 are installed in the terminal holes 311 and 312 of the cap plate 30, the negative and positive terminals 41 and 42 are connected to the negative and positive lead tabs 51 and 52 via flanges 41a and 42a extended inside the case 20 and are connected to terminal plates 41b and 42b outside the case 20. The terminal plates 41b and 42b may be connected to other neighboring rechargeable batteries (not shown) through a bus bar (not shown), such as by welding. Accordingly, the terminal plates 41b and 42b may connect a plurality of rechargeable batteries 100 in series or in parallel.

The rechargeable battery 100, according to an exemplary embodiment, includes gaskets 45 and 46 and insulators 47 and 48 respectively disposed between the negative and positive terminals 41 and 42 and the terminal holes 311 and 312 of the cap plate 30 to provide an electrically insulating structure and a sealing structure to contain the electrolyte.

The gaskets 45 and 46, in one embodiment, are respectively inserted between the negative and positive terminals 41 and 42 and the terminal holes 311 and 312 and are further extended between the flanges 41a and 42a and an internal surface of the cap plate 30 to provide electrical insulation between the negative and positive terminals 41 and 42 and the cap plate 30 and for the sealing of the terminal holes 311 and 312. The insulators 47 and 48, in one embodiment, are inserted between the negative and positive terminals 41 and 42 and the terminal holes 311 and 312 and are further extended between the terminal plates 41b and 42b and an outer surface of the cap plate 30 such that the negative and positive terminals 41 and 42 and the cap plate 30 are electrically insulated and the terminal holes 311 and 312 are further sealed.

The negative and positive lead tabs 51 and 52 are formed of a conductive member such that the negative and positive terminals 41 and 42 are electrically connected to the respective uncoated regions 11b and 12b of the negative and positive electrodes 11 and 12 of the electrode assembly 10. In one embodiment, the negative and positive lead tabs 51 and 52 are coupled to inner end portions of the negative and positive terminals 41 and 42 to caulk the negative and positive lead tabs 51 and 52, and thereby the negative and positive lead tabs 51 and 52 are supported by the flanges 41a and 42a and are connected to the inner end portion of the negative and positive terminals 41 and 42 via the connected structure.

In one embodiment, the rechargeable battery 100 further includes insulating members 71 and 72 electrically insulating the negative and positive lead tabs 51 and 52, respectively, and the cap plate 30. In one embodiment, the insulating members 71 and 72 are installed between the negative and positive lead tabs 51 and 52 and the cap plate 30 such that the flanges 41a and 42a and the cap plate 30 are electrically insulated from one another, and the negative and positive lead tabs 51 and 52 connected to the flanges 41a and 42a are electrically insulated from the cap plate 30.

The through holes 61 and 62, in one embodiment, are formed at the uncoated regions 11b and 12b and allow the internal gas generated inside the electrode assembly 10 to be dispersed and emitted to the outside of the electrode assembly 10, that is, to the inside of the case 20. In one embodiment, as shown in FIG. 2, the through holes 61 and 62 are provided at both ends of the electrode assembly 10 such that the gas generated inside the electrode assembly 10 is quickly and uniformly or substantially uniformly dispersed and emitted to both sides of the electrode assembly 10.

Figure 3:
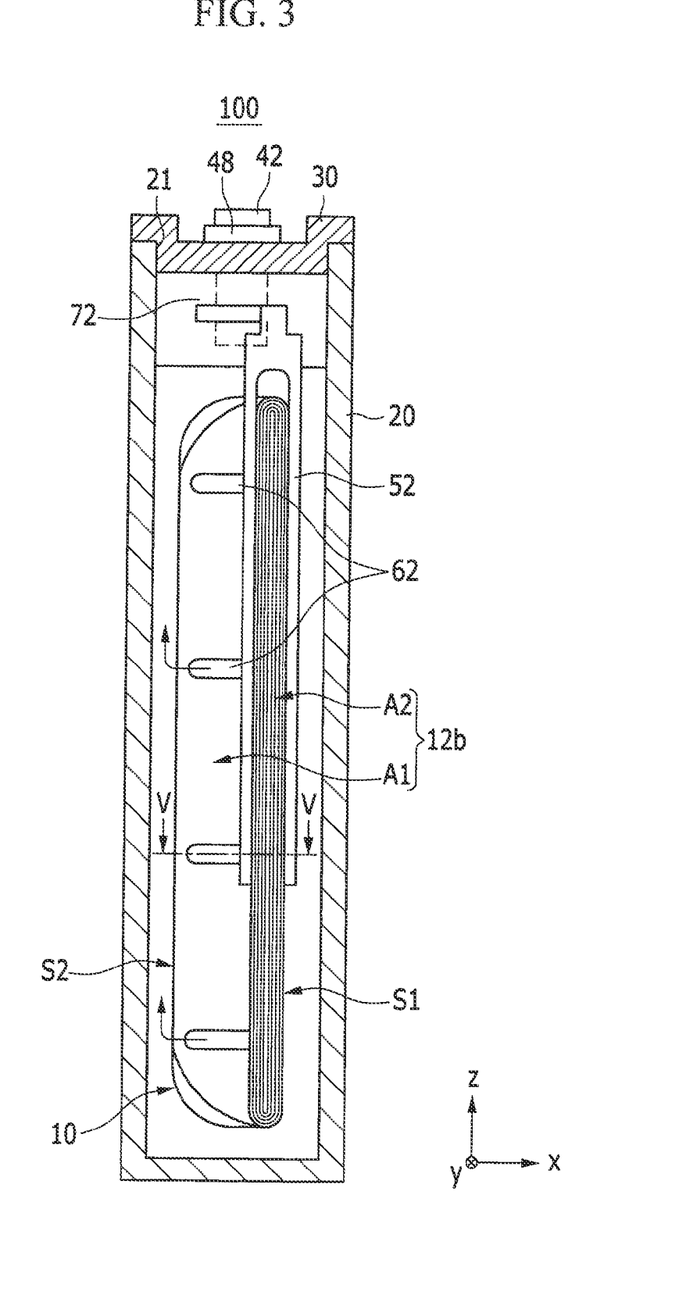
FIG. 3 is a cross-sectional view of the rechargeable battery of FIG. 1, taken along the line of FIG. 2.
Figure 4:
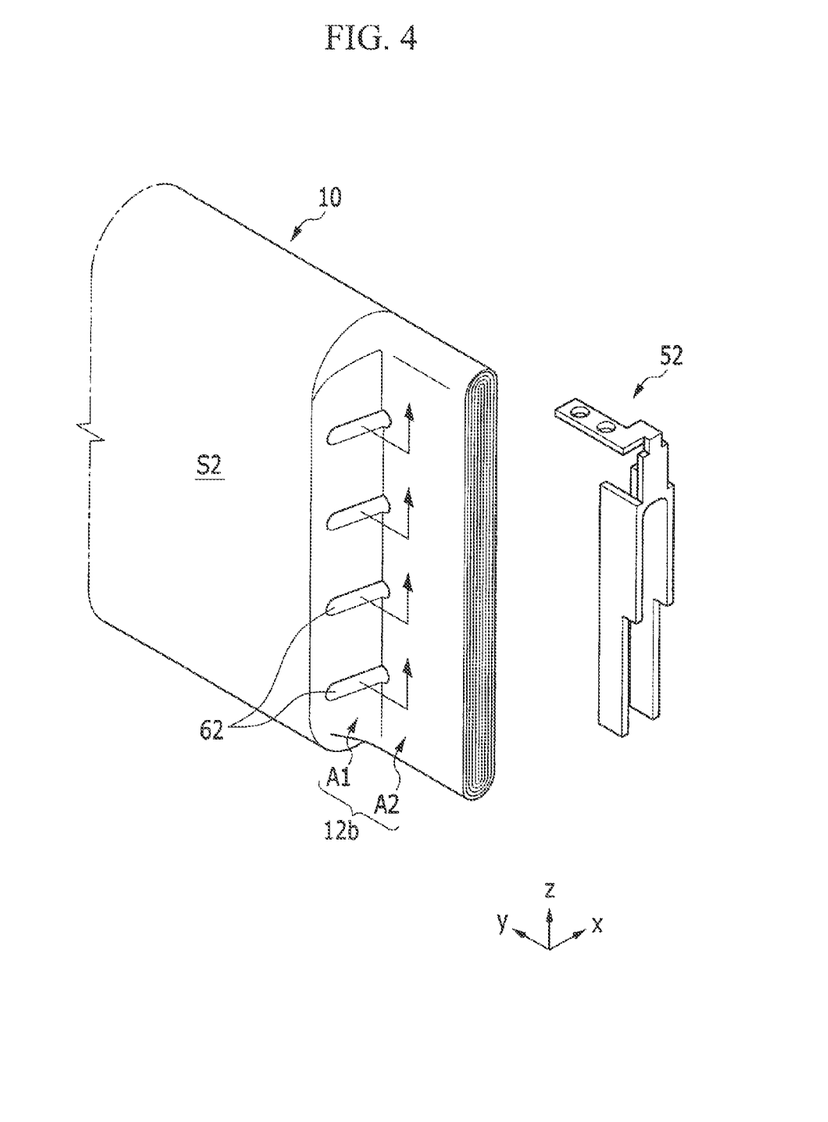
FIG. 4 is an exploded perspective view of an electrode assembly and a positive lead tab of the rechargeable battery of FIG. 1.

FIG. 3 is a cross-sectional view of the rechargeable battery 100, taken along the line III-III of FIG. 2, and FIG. 4 is an exploded perspective view of the electrode assembly 10 and the positive lead tab 52. In the electrode assembly 10 according to one embodiment, a connection structure of the uncoated region 11b of the negative electrode 11 and the negative electrode lead tab 51 and a connection structure of the uncoated region 12b of the positive electrode 12 and the positive lead tab 52 are the same or substantially the same, and, therefore, only the connection structure of the uncoated region 12b of the positive electrode 12 and the positive lead tab 52 is described below.

In the electrode assembly 10, the separator 13 is disposed between the coated regions 11a and 12a, and the separator 13 is not disposed adjacent to the uncoated region 12b connected to the end portion of the coated region 12a. In one embodiment, the uncoated region 12b is compressed and deformed and is then mechanically and electrically connected (e.g., by welding) to the positive lead tab 52.

Figure 5:
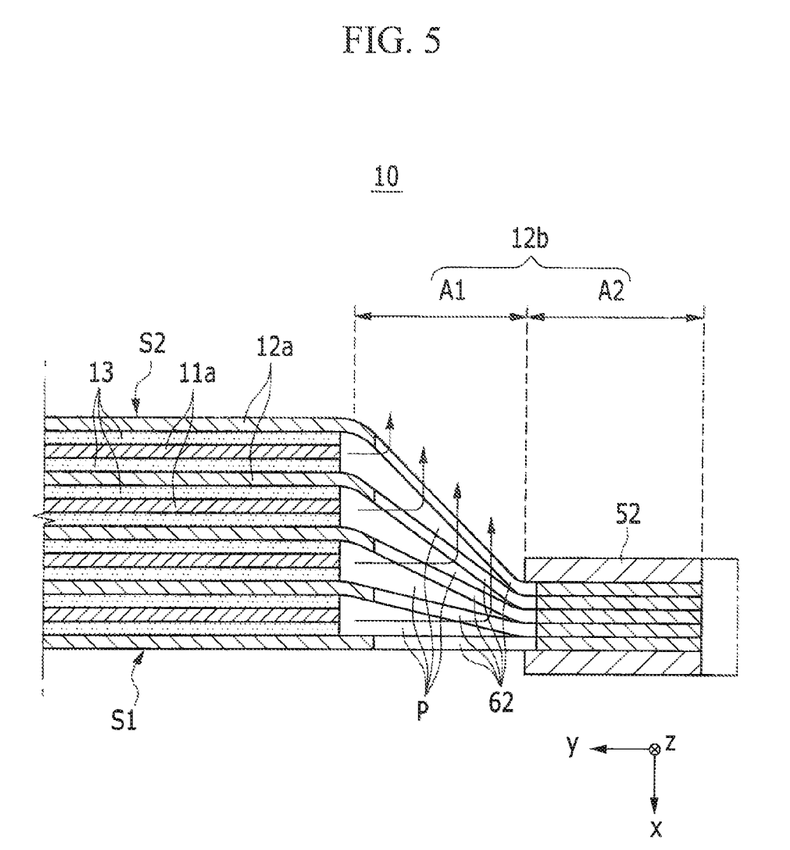
FIG. 5 is a cross-sectional view of the electrode assembly and the positive lead tab of FIG. 4, taken along the line V-V of FIG. 3.

FIG. 5 is a cross-sectional view of the electrode assembly 10 and the positive lead tab 52, taken along the line V-V of FIG. 3. Referring to FIG. 4 and FIG. 5, from the end portion of the coated region 12a, the uncoated region 12b forms a slant region A1 and a junction region A2 after being compressed and deformed. In one embodiment, in the uncoated region 12b, the slant region A1 is continuous to the end portion of the coated region 12a, and the junction region A2 is continuous to the slant region A1 and connected to the positive lead tab 52.

The through hole 62 communicating between the inside and outside of the electrode assembly 10 is formed at the slant region A1 of the uncoated region 12b, and in an exemplary embodiment, the through hole 62 may extend to the junction region A2. That is, in one embodiment, the through hole 62 is formed as a slot that is continuous from the slant region A1 to the junction region A2, such that the exhaust path for a large portion of a region where a deposition direction (e.g., the x-axis direction of FIG. 5) of the coated regions 11a and 12a and the separator 13 is formed may be obtained. In one embodiment, the through hole 62 is penetrated and formed in a direction intersecting the slant region A1 in the slant region A1, that is, the deposition direction (e.g., the x-axis direction). Accordingly, the internal gas of the electrode assembly 10 may be uniformly or substantially uniformly dispersed and diffused between the deposited coated regions 11a and 12a and the separator 13.

In one embodiment, a plurality of through holes 62 are formed at an interval (e.g., a predetermined interval) along an entire region that is formed in a height direction (e.g., a z-axis direction of FIG. 3 and FIG. 4) of the electrode assembly 10 such that the exhaust path may be provided for most of the portion of the height direction (e.g., the z-axis direction). Accordingly, the internal gas of the electrode assembly 10 may be uniformly or substantially uniformly dispersed and diffused in the height direction (e.g., the z-axis direction).

Referring to FIG. 3 to FIG. 5, the electrode assembly 10 has a first outer surface S1 and a second outer surface S2 forming opposite surfaces. In one embodiment, in the uncoated region 12b, the first outer surface S1 is connected with a planar surface in the junction region A2 and the slant region A1, and the second outer surface S2 is connected with a curved surface in the junction region A2 and the slant region A1. Also, while progressing from the first outer surface S1 to the second outer surface S2, an angle of the curved surface formed by the uncoated region 12b is gradually decreased. That is, the uncoated region 12b becomes closer to the planar surface as the uncoated region 12b becomes closer to the first outer surface S1.

The through holes 62, in one embodiment, are formed in the uncoated regions 12b deposited in the slant region A1, thereby being connected in the through direction (e.g., the x-axis direction of FIG. 5). That is, the through holes 62, in one embodiment, are passed through and formed in a direction perpendicular to the first outer surface S1 of the slant region A1. Accordingly, the through holes 62 are formed largest at the second outer surface S2 according to a degree of inclination of the uncoated region 12b and are formed smallest at the first outer surface S1.

The slant region A1 forms passages P between the uncoated regions 12b, and the passages P form a maximum opening area at the side of the second outer surface S2 and a minimum opening area at a side of the first outer surface S1, and are connected to the through holes 62. Accordingly, the internal gas emitted between the uncoated regions 12b in the slant region A1 is moved in the height direction (e.g., the z-axis direction in FIG. 3 and FIG. 5) of the uncoated region 12b and dispersed and emitted outside the electrode assembly 10 through the through holes 62.

For example, when a short circuit is generated inside the rechargeable battery 100, the potential difference between the negative electrode 11 and the positive electrode 12 is quickly reduced such that heat is generated and the electrolyte solution is decomposed. Due to the decomposition of the electrolyte solution, a large amount of gas may be instantaneously or rapidly generated and is dispersed and diffused to the passages P of the slant region A1 of the uncoated region 12b and is emitted outside the electrode assembly 10 through the through holes 62 connected to the passages P. The gas emitted outside the electrode assembly 10 moves from a side of the opening 21 of the case 20 toward the vent hole 32 and ruptures the vent plate 34 and is emitted to the outside of the rechargeable battery 100.

A rechargeable battery according to another exemplary embodiment of the present invention is described below. Description of components and features of the rechargeable battery described below which are the same as those of the rechargeable battery 100 described above are omitted, and only the differences are described.

Figure 6:
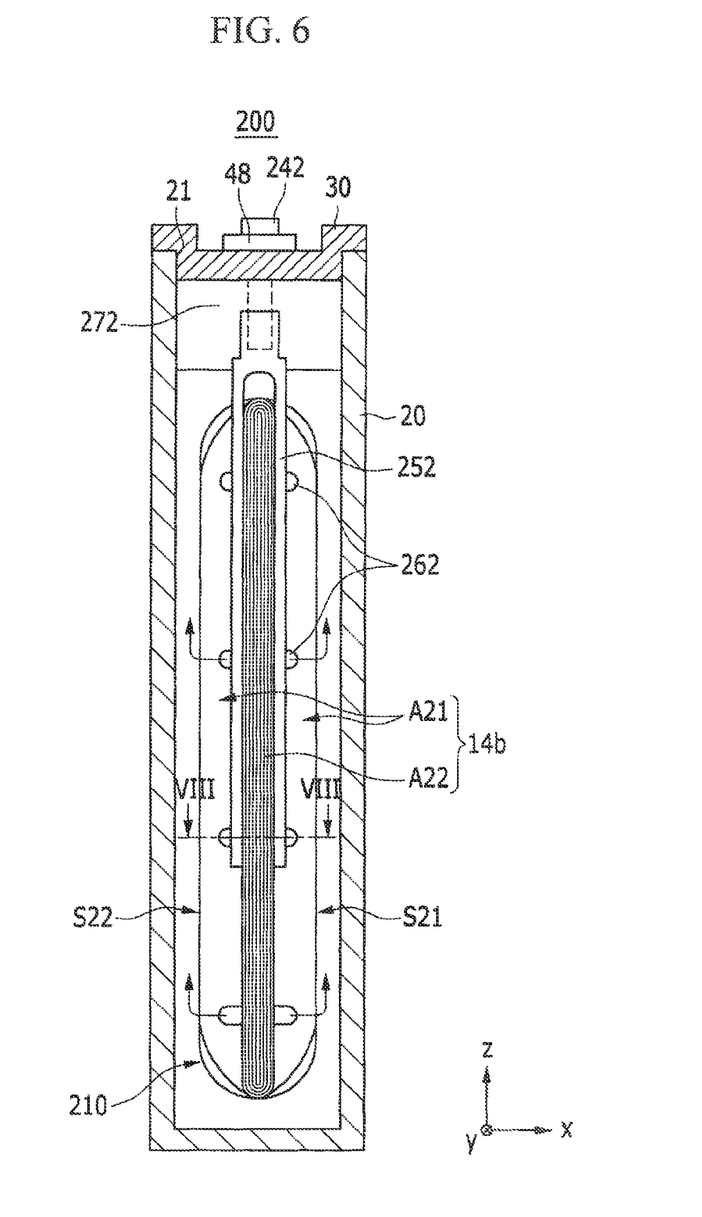
FIG. 6 is a cross-sectional view of a rechargeable battery according to another exemplary embodiment of the present invention.
Figure 7:
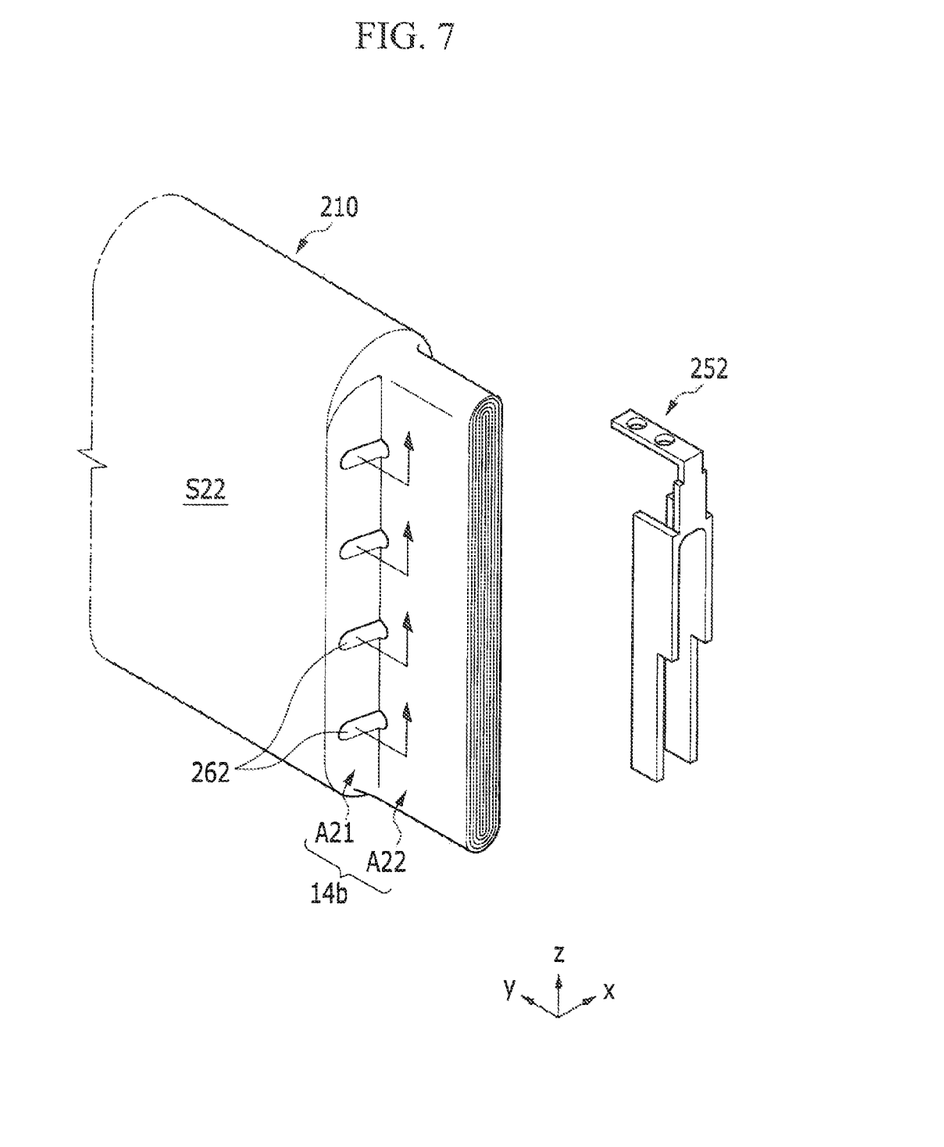
FIG. 7 is an exploded perspective view of an electrode assembly and a positive lead tab of the rechargeable battery of FIG. 6.
Figure 8:
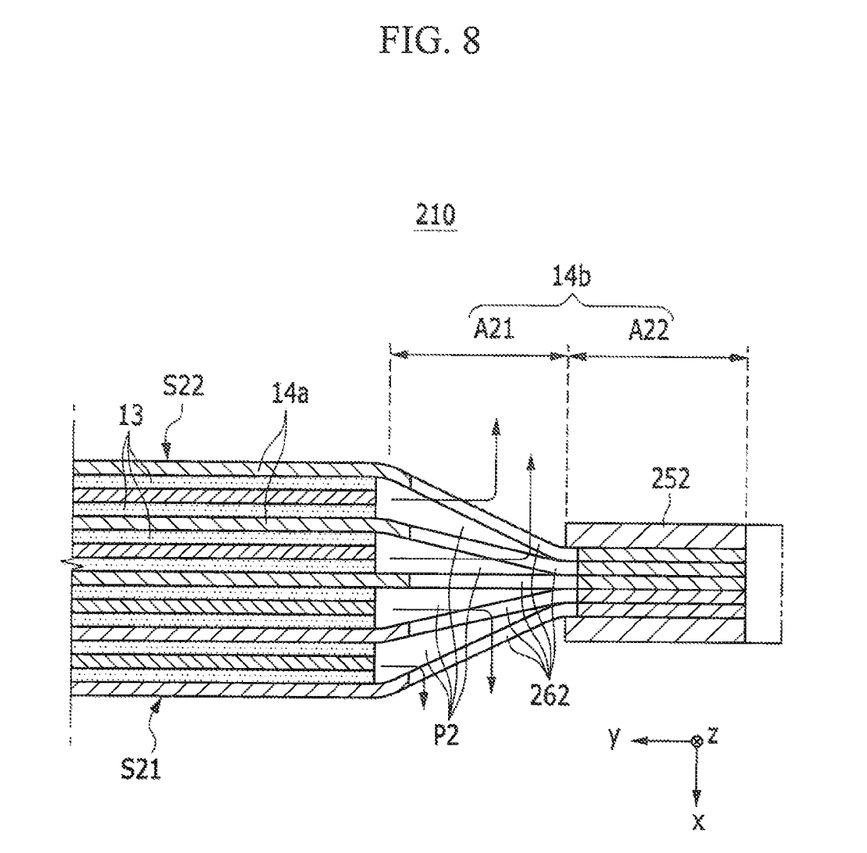
FIG. 8 is a cross-sectional view of the electrode assembly and the positive lead tab of FIG. 7, taken along the line VIII-VIII of FIG. 6.

FIG. 6 is a cross-sectional view of a rechargeable battery 200 according to another exemplary embodiment of the present invention; FIG. 7 is an exploded perspective view of an electrode assembly 210 and a lead tab 252 (e.g., a positive lead tab) of the rechargeable battery 200 shown in FIG. 6; and FIG. 8 is a cross-sectional view of the electrode assembly 210 and the lead tab 252 of the rechargeable battery 200, taken along the line VIII-VIII of FIG. 6. Referring to FIG. 6 to FIG. 8, the electrode assembly 210 of the rechargeable battery 200 has a first outer surface S21 and a second outer surface S22 of a symmetrical structure. The symmetrical structure is different from the asymmetrical structure of the first and second outer surfaces S1 and S2 of the electrode assembly 10 described above.

That is, the positive lead tab 52 of the rechargeable battery 100 described above is connected to the positive terminal 42 in the asymmetrical structure and is received by the insulating member 72 in the asymmetrical structure, but the lead tab 252 of the rechargeable battery 200 is connected to a terminal 242 (e.g., a positive terminal) in the symmetrical structure and is received by an insulating member 272 in the symmetrical structure.

In one embodiment, in the rechargeable batteries 100 and 200, the case 20 receives one electrode assembly 10 or 210 and the lead tabs 52 or 252 correspond thereto. However, the rechargeable battery according to another embodiment of the present invention may receive a plurality of electrode assemblies, and may include a lead tab configured to correspond to a plurality of electrode assemblies (not shown).

In the rechargeable battery 200, in an uncoated region 14b formed at an end portion of a coated region 14a of an electrode of the electrode assembly 210, the first outer surface S21 is connected with a first curved surface in the junction region A22 and the slant region A21, and the second outer surface S22 is connected with the second curved surface that is symmetrical to the first curved surface in a junction region A22 of the uncoated region 14b and a slant region A21 of the uncoated region 14b.

Through holes 262 are formed at the uncoated regions 14b in the slant region A21 and are connected in a through direction (e.g., the x-axis direction of FIG. 8). In one embodiment, each through hole 262 is penetrated and formed in the direction perpendicular to the uncoated region 14b positioned at a center of, or equidistant from, the first outer surface S21 and the second outer surface S22 of the slant region A21. Accordingly, the through holes 262 are the same and are largest in the first and second outer surfaces S21 and S22 according to a degree of inclination of the deposited uncoated region 14b, and are smallest in the center of the uncoated region 14b.

Passages P2 are formed in the slant region A21 between the uncoated regions 14b, and the passages P2 are the same at the sides of the first and second outer surfaces S21 and S22 and form a largest opening area there, and form a smallest opening area at the center of the uncoated region 14b, and are connected to the through holes 262. Accordingly, the internal gas emitted between the uncoated regions 14b in the slant region A21 is moved in a height direction (e.g., the z-axis direction of FIG. 6 and FIG. 7) of the uncoated region 14b and dispersed and emitted outside the electrode assembly 210 through the through holes 262.

The through holes 62 of the rechargeable battery 100 disperse and emit the internal gas at one side of the second outer surfaces S2 of the electrode assembly 10, and the through holes 262 of the rechargeable battery 200 disperse and emit the internal gas at both sides of the first and second outer surfaces S21 and S21 of the electrode assembly 210.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising;
an electrode assembly comprising a first electrode, a second electrode, and a separator between the first and second electrodes;
a case receiving the electrode assembly;
a cap plate coupled to the case;
an electrode terminal connecting the electrode assembly to an outside of the cap plate;
a first lead tab coupled to the first electrode at a first end of the electrode assembly and electrically connecting the first electrode and the electrode terminal; and
a second lead tab coupled to the second electrode at a second end of the electrode assembly, the first end being opposite and spaced apart from the second end in a lengthwise direction of the electrode assembly,
wherein the electrode assembly comprises:
a first coated region of the first electrode;
a second coated region of the second electrode;
a second uncoated region of the second electrode at the second end of the electrode assembly; and
a first uncoated region of the first electrode at the first end of the electrode assembly, the first uncoated region adjacent an end portion of the first coated region, the first uncoated region comprising a slant region extending toward the end portion of the first coated region, and a junction region connected to the slant region and coupled to the first lead tab, the junction region spaced apart from the end portion of the first coated region in the lengthwise direction, the first uncoated region having a through hole formed therein at least at the slant region and connecting an inner portion of the electrode assembly to an outside of the electrode assembly, the through hole being at least formed at a location between the first coated region and the first lead tab and spaced apart from a portion of the first lead tab that is directly connected to the first electrode in a direction opposite the lengthwise direction such that an open exhaust path is defined by the through hole from a first side of the first uncoated region to a second side of the first uncoated region in a direction perpendicular to the lengthwise direction.

2. The rechargeable battery of claim 1, wherein the through hole is formed as a slot extending from the slant region to the junction region.

3. The rechargeable battery of claim 1, wherein the through hole is penetrated and formed in a direction intersecting the slant region in the slant region.

4. The rechargeable battery of claim 1,
wherein the electrode assembly further comprises a first outer surface and a second outer surface opposite the first outer surface, and
wherein, in the first uncoated region, the first outer surface is a planar surface extending between the junction region and the slant region, and the second outer surface comprises a curved surface between the junction region and the slant region.

5. The rechargeable battery of claim 4,
wherein the first uncoated region includes a plurality of first uncoated regions, and the through hole is farmed through the first uncoated regions in the slant region, and
wherein the through hole has a largest area at the second outer surface and a smallest area in the first outer surface.

6. The rechargeable battery of claim 1,
wherein the electrode assembly further comprises a first outer surface and a second outer surface opposite the first outer surface,
wherein the first uncoated region includes a plurality of first uncoated regions, and the through hole is formed through the first uncoated regions in the slant region,
wherein the slant region includes passages between the first uncoated regions, and
wherein the passages form a largest opening area at a side proximate the second outer surface and a smallest opening area at a side proximate the first outer surface, and are connected to the through hole.

7. The rechargeable battery of claim 1,
wherein the electrode assembly further comprises a first outer surface and a second outer surface opposite the first outer surface, and
wherein, in the first uncoated region, the first outer surface comprises a first curved surface between the junction region and the slant region, and the second outer surface comprises a second curved surface between the junction region and the slant region that is symmetrical to the first curved surface.

8. The rechargeable battery of claim 7,
wherein, the first uncoated region includes a plurality of first uncoated regions, and the through hole is formed through the first uncoated regions in the slant region, and
wherein the through hole has a largest area at the first and second outer surfaces and a smallest area at a location that is central between the first and second outer surfaces.

9. The rechargeable battery of claim 1,
wherein the electrode assembly further comprises a first outer surface and a second outer surface opposite the first outer surface,
wherein the first uncoated region includes a plurality of first uncoated regions, and the through hole is formed through the first uncoated regions in the slant region,
wherein the slant region includes passages between the uncoated regions, and
wherein the passages form a same largest opening area at sides proximate the first and second outer surfaces and a smallest opening area at a location that is central between the first and second outer surfaces, and are connected to the through hole.

* * * * *